US009648073B2

(12) United States Patent
Kafle et al.

(10) Patent No.: US 9,648,073 B2
(45) Date of Patent: May 9, 2017

(54) STREAMING CONTROL FOR REAL-TIME TRANSPORT PROTOCOL

(71) Applicant: QUALCOMM Incorporated, San Diego, CA (US)

(72) Inventors: Padam Lal Kafle, San Diego, CA (US); Sanjay Kumar Agrawal, San Diego, CA (US); Vijay Naicker Subramaniam, San Diego, CA (US); Sanal Kumar Karunakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 14/680,259

(22) Filed: Apr. 7, 2015

(65) Prior Publication Data

US 2015/0295982 A1 Oct. 15, 2015

Related U.S. Application Data

(60) Provisional application No. 61/978,121, filed on Apr. 10, 2014.

(51) Int. Cl.
*G06F 15/16* (2006.01)
*H04L 29/06* (2006.01)
(Continued)

(52) U.S. Cl.
CPC ........ *H04L 65/608* (2013.01); *H04L 43/0852* (2013.01); *H04L 65/1083* (2013.01);
(Continued)

(58) Field of Classification Search
CPC .............. H04L 65/608; H04L 43/0852; H04L 65/1083; H04L 65/80; H04L 69/161; H04L 69/18; H04L 69/40
See application file for complete search history.

(56) References Cited

U.S. PATENT DOCUMENTS 9,137,560 B2* 9/2015 Roberts .............. H04N 21/4126
9,418,544 B2* 8/2016 Relyea ................. G08G 1/0104
(Continued)

FOREIGN PATENT DOCUMENTS

KR 20130070330 A 6/2013
WO WO-2012057545 A2 5/2012

OTHER PUBLICATIONS

Aktas et al., "An Adaptive Codec Switching Scheme for SIP-Based VoIP," Internet of Things, Smart Spaces, and Next Generation Networking, Proceedings of the 12th International Conference, NEW2AN 2012, and 5th Conference, ruSMART 2012, St. Petersburg, Russia, Aug. 27-29, 2012, pp. 347-358, vol. 7469 of the series Lecture Notes in Computer Science, ISBN 978-3-342-32685-1, Springer-Verlag, Berlin.
(Continued)

*Primary Examiner* — Moustafa M Meky
(74) *Attorney, Agent, or Firm* — Holland & Hart LLP

(57) ABSTRACT

Dynamic control of transport protocols utilized in the streaming of media content based in part on the type of content, latency requirements, network conditions and/or device capabilities is described. The techniques provide a source device to dynamically switch between User Datagram Protocol (UDP) and Transmission Control Protocol (TCP) to stream media content to a sink device. For example, during a Wi-Fi peer-to-peer remote display session associated with real-time media content (e.g., live streaming sporting event, or gaming applications), the source device may utilize Real-time Transport Protocol (RTP) over UDP to transmit the media stream to the sink device. Conversely, when the media content is not latency critical, such as playback of stored media (e.g., movie), the source device may dynamically switch to RTP over TCP in order to provide reliable data transmission.

30 Claims, 10 Drawing Sheets

(51) Int. Cl.
*H04L 12/26* (2006.01)
*H04L 29/14* (2006.01)
(52) U.S. Cl.
CPC ............ *H04L 65/80* (2013.01); *H04L 69/161* (2013.01); *H04L 69/18* (2013.01); *H04L 69/40* (2013.01)

(56) References Cited

U.S. PATENT DOCUMENTS

| | | | |
|---|---|---|---|
| 9,496,971 B2* | 11/2016 | Edge | H04W 8/005 |
| 2009/0271101 A1* | 10/2009 | Relyea | G08G 1/0104 |
| | | | 701/118 |
| 2016/0307442 A1* | 10/2016 | Relyea | G08G 1/0104 |

OTHER PUBLICATIONS

ISA/EPO, International Search Report and Written Opinion of the International Searching Authority, Int'l Appl. No. PCT/US2015/024825, Jul. 10, 2015, European Patent Office, Rijswijk, NL, 12 pgs.

* cited by examiner

US 9,648,073 B2

STREAMING CONTROL FOR REAL-TIME TRANSPORT PROTOCOL

CROSS REFERENCES

The present Application for Patent claims priority to U.S. Provisional Patent Application No. 61/978,121 by Kafle et al., entitled "Streaming Control for Real-Time Transport Protocol," filed Apr. 10, 2014, assigned to the assignee hereof, and expressly incorporated by reference herein.

BACKGROUND

The following relates generally to wireless communication, and more specifically to Wi-Fi peer-to-peer remote display. Wireless communications systems are widely deployed to provide various types of communication content such as voice, video, packet data, messaging, broadcast, and so on. These systems may be wireless local area network (WLAN), also known as Wi-Fi systems which utilize carrier sense multiple access with collision avoidance (CSMA/CA) mechanisms to access a wireless medium. These systems may also be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

As mobile devices are used to capture or generate content such as audio, video, or multimedia, users may desire to share content between mobile devices and other devices such as TVs, computers, audio systems, and the like. One approach is for one device (i.e., a sink device) to mirror what is displayed on another device (i.e., a source device). Examples of a source device may include a smartphone, tablet, and the like. Examples of a sink device may include a TV, computer screen, etc. In some applications, the source device may transmit the media stream over a wireless link. For example, a Wi-Fi peer-to-peer network allows wireless devices to directly communicate with each other. Devices within range of each other may discover and communicate directly without involving central access points.

Wi-Fi peer-to-peer connections allow source devices to wirelessly transmit media content such as video and/or audio to a compatible sink display. Various approaches have been considered to effectively transmit the media content from the source device to the sink device. For instance, on approach allows a source device to encapsulate media content using an MPEG2 Transport Stream (MPEG-TS) for transmission over a medium utilizing Real-time Transport Protocol (RTP) over User Datagram Protocol (UDP). The RTP, designed for end-to-end, real-time transfer of streaming content, defines a standardized packet format for delivering media content over Internet Protocol (IP) networks. Conventional methods for Wi-Fi peer-to-peer remote display implement RTP over UDP because UDP is suitable for real-time transfer of latency critical multimedia content. UDP protocol, however, relies on Wi-Fi MAC layer retransmissions, which may result in quality artifacts if the network congestion grows above a certain threshold.

SUMMARY

The described features generally relate to one or more improved systems, methods, and/or apparatuses for dynamic control of transport protocols utilized in transmission of the streaming media content based in part on the type of content, latency requirements, network conditions and/or device capabilities. In some examples, the source device may dynamically switch between User Datagram Protocol (UDP) and Transmission Control Protocol (TCP) to stream media content to the sink device. For example, during a Wi-Fi peer-to-peer remote display session associated with real-time media content (e.g., live streaming, gaming, or display of interactive user inputs), the source device may utilize Real-time Transport Protocol (RTP) over UDP to transmit the media stream to the sink device. Conversely, when the media content is not latency critical, such as playback of stored media (e.g., movie), the source device may dynamically switch to RTP over TCP in order to provide reliable data transmission. As a result, the source device and the sink device may select an appropriate transport mechanism based on the type of content to stream, network conditions and/or device capabilities during a Wi-Fi peer-to-peer remote display session.

In another example, the source device may control playback functions, such as volume of the sink device processing the media stream. As a result, the volume change may be reflected immediately even when there is buffered data yet to be played at the sink device. Further, the playback volume control functionalities of the present disclosure may be used to control the volume at the sink device irrespective of the volume level of the audio in the media stream transmitted from the source device.

In a first set of illustrative examples, a method for wireless communication is provided. The method may comprise initiating, by a source device, a media stream to a sink device over a first protocol during a Wi-Fi peer-to-peer remote display session. The source device may further identify a second protocol supported by the sink device and dynamically switching to the second protocol to transmit the media stream during the Wi-Fi peer-to-peer remote display session.

In one example, the first protocol may comprise a user datagram protocol (UDP) and the second protocol may comprise transmission control protocol (TCP). In another example, the first protocol may comprise TCP and the second protocol may comprise UDP. In some examples, identifying the second protocol supported by the sink device may comprise transmitting a query to the sink device to determine whether the sink device supports TCP and one or more ports to be used for a TCP connection. In response, the source device may receive a message affirming that the sink device supports TCP and the ports information.

The source device may further transmit, in response to receiving the message, a setup request to the sink device, wherein the setup request may comprise profile and port information. The source device may further query the sink device to determine decoder latency and a buffer size of the sink device. In some examples, dynamically switching from the first protocol to the second protocol is based at least in part on a type of media content, network conditions, or available buffer space at the sink device. The source device may further select, based at least in part on the type of media content, network conditions, or available buffer space at the sink device, a buffer size to be used by the sink device for buffering the media stream prior to initiating playback. The source device may further transmit the selected buffer size to the sink device.

In one example, the source device may further query the sink device for presentation timestamp (PTS) value of the media stream being played and a pending buffer size of the media stream waiting to be played. The source device may receive a message, in response to the query, indicating the PTS value of the media stream currently being played and the buffer size of the media stream waiting to be played. In some examples, the source device may issue a flush control command to flush the buffer of the sink device, wherein the flush control command instructs the sink device to discard data in the sink buffer until a data packet with the PTS value. In another example, the source device may issue a volume control command to the sink device, wherein the volume control command controls the playback volume of the media stream at the sink device.

In a second set of illustrative examples, an apparatus for wireless communication is provided. The apparatus may comprise a processor and a memory in electronic communications with the processor. The memory may embody instructions being executable by the processor to initiate, by a source device, a media stream to a sink device over a first protocol during a Wi-Fi peer-to-peer remote display session. The instructions may further be executable by the processor to identify a second protocol supported by the sink device and dynamically switch to the second protocol to transmit the media stream during the Wi-Fi peer-to-peer remote display session. In certain examples, the apparatus may implement one or more aspects of the method for wireless communications described above with respect to the first set of illustrative examples.

In a third set of illustrative examples, an apparatus for wireless communication is provided. The apparatus may comprise a multi-protocol communication component to initiate, by a source device, a media stream to a sink device over a first protocol during a Wi-Fi peer-to-peer remote display session. The apparatus may further comprise a capability analysis component to identify a second protocol supported by the sink device and a dynamic switching component to dynamically switch to the second protocol to transmit the media stream during the Wi-Fi peer-to-peer remote display session. In certain examples, the apparatus may implement one or more aspects of the method for wireless communications described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to systems and methods for the source device to dynamically switch between User Datagram Protocol (UDP) and Transmission Control Protocol (TCP) to stream media content, such as audio and/or video data, to the sink device. For instance, during a Wi-Fi peer-to-peer remote display session associated with real-time media content (e.g., streaming sporting event), the source device may utilize Real-time Transport Protocol (RTP) over UDP to stream the media content to the sink device. Conversely, when the media content is not latency critical, such as playback of stored media (e.g., movie), the source device may dynamically switch to RTP over TCP in order to provide reliable data transmission. As a result, the source device and the sink device may dynamically select the transport mechanism based on the type of content to stream, network conditions and/or device capabilities during a Wi-Fi peer-to-peer remote display session.

In another example, the source device may control playback functions, such as volume of the sink device that processes the media stream. As a result, the volume change may be reflected immediately even when there is buffered data yet to be played at the sink device. Further, the playback volume control functionalities of the present disclosure may be used to control the volume at the sink device irrespective of the volume level of the audio in the media stream transmitted from the source device.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
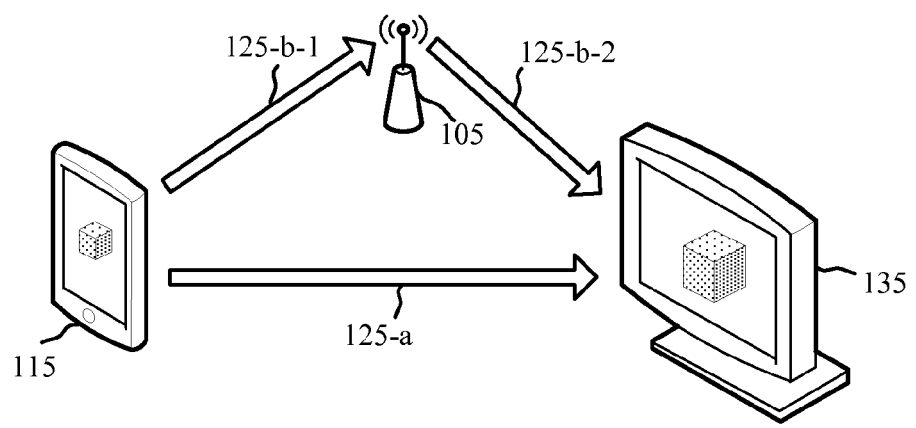
FIG. 1 shows a diagram of a system for display of content from one device onto the display of another device by video and/or audio content streaming in accordance with various embodiments.

Referring now to FIG. 1, a system 100 includes a source device 115 and a sink device 135 and may include one or more access points 105. Examples of the source device 115 may include, but are not limited to, smartphones, cell phones, wireless headphones, wearable computing devices, tablets, personal digital assistants (PDAs), laptops, or any other device capable of communicating with a sink device 135 via a connection (e.g., wired, cellular wireless, Wi-Fi, etc.). Examples of the sink device 135 may include, but are not limited to, in-vehicle infotainment devices, TVs, computers, laptops, projectors, cameras, smartphones, wearable computing devices, or any other device capable of communicating with a source device 115 and displaying content received from the source device 115. The sink device 135 may be a combination of devices. For example, the sink device 135 may include a display device and a separate device for receiving, buffering, and decoding content for display on the display device.

Source device 115 may be connected to sink device 135 via link 125. Link 125 is illustrated in FIG. 1 as a wireless link but may be a wired or wireless link in some embodiments. Communications between a source device 115 and a sink device 135 connected via a wireless peer-to-peer connection may be performed to remotely render content of the source device 115 at the sink device 135. Wi-Fi remote display includes, but is not limited to the Wi-Fi Display specification, also known as Miracast® from Wi-Fi Alliance, Discovery and Launch (DIAL), Digital Living Network Alliance® (DLNA), Airplay, WirelessHD, Wireless Home Digital Interface (WHDI), Intel's Wireless Display (Wi-Di) technology, and Ultra-wideband (UWB) connections. While the following techniques are described using the wireless networking architecture illustrated in FIG. 1, the described techniques are applicable to any suitable wired or wireless communication technology.

In one embodiment, the source device 115 is connected to the sink device 135 via a Wi-Fi Display connection. Wi-Fi Display protocol, which may be known as Miracast, allows a portable device or computer to transmit media content (e.g., video, audio, images, etc.) to a compatible display wirelessly. It enables delivery of compressed standard or high-definition video over a wireless link 125. It also may allow users to echo the display from one device onto the display of another device. Wireless link 125 may be a direct wireless link (e.g., peer-to-peer link 125-a), or an indirect wireless link (e.g., indirect link 125-b) through a Wi-Fi access point. Examples of direct wireless links include Wi-Fi Direct connections and connections established by using a Wi-Fi Tunneled Direct Link Setup (TDLS) link.

Wi-Fi Display allows users to echo the display from one device onto the display of another device by video and/or audio content streaming. The link 125 between the source device 115 and sink device 135 may be bi-directional. In one example, the connection between the source device 115 and a sink device 135 may also allow users to launch applications stored on the source device 115 via the sink device 135. For example, the sink device 135 may include various input controls (e.g., mouse, keyboard, knobs, keys, user interface buttons). These controls may be used at the sink device 135 to initialize and interact during the audio/video streaming from the source through the media applications stored on the source device 115.

Wi-Fi Display may use a transport stream, such as an MPEG2 Transport Stream (MPEG-TS). The content may be encoded according to a media encoding format (e.g., h.264, MPEG-4, h.265, etc.) and may be multiplexed into the transport stream with other information (e.g., error correction, stream synchronization, etc.) for transmission to the sink device 135. The system 100 including the source device 115 may be configured to dynamically switch between UDP and TCP to stream media content such as audio and/or video data to the sink device 135. For instance, during a Wi-Fi peer-to-peer remote display session associated with the real-time media content (e.g., live streaming, gaming, or display of interactive user inputs), the source device may utilize RTP over UDP to stream the media content to the sink device. Conversely, when the media content is not latency critical, such as playback of stored media (e.g., movie), the source device may dynamically switch to RTP over TCP in order to provide reliable data transmission. Adding the capabilities of TCP transport for carrying media data in a Wi-Fi peer-to-peer display session allows a source device and the sink device to select the best transport mechanism based on the type of content, network conditions, or the other implementation factors such as available buffering. Because the connection-oriented TCP is suited to adapt to link conditions, utilization of TCP may substantially improve the quality of media playback in congested network environments.

In some examples, before or after a Wi-Fi peer-to-peer remote display connection has been established between the source device 115 and the sink device 135, the devices may engage in a capability negotiation procedure. As part of the capability negotiation procedure, the source device 115 may query the sink device 135 for various information regarding the capabilities of the sink device 135 to establish a Wi-Fi remote display connection. The source device 115 may query the sink device 135 by sending Real-Time Streaming Protocol (RTSP) request messages. In one example, the source device 115 may query the sink device 135 using RTSP request messages (e.g., Get_Parameter request message) to determine whether the sink device 135 is capable of supporting the use of TCP transport for media data, including a dual-mode communication, wherein the dual-mode communication may comprise supporting RTP media content transport over UDP and/or TCP.

In one example, during the capability negotiation procedure, the sink device 135 may generate a response to the queries to indicate whether the sink device 135 is capable of supporting dual-mode communication (i.e., UDP and TCP). Once the capability negotiation procedure has concluded, the source device 115 may establish communication with the sink device 135 to stream RTP media content to the sink device via either UDP or TCP.

Figure 2A:
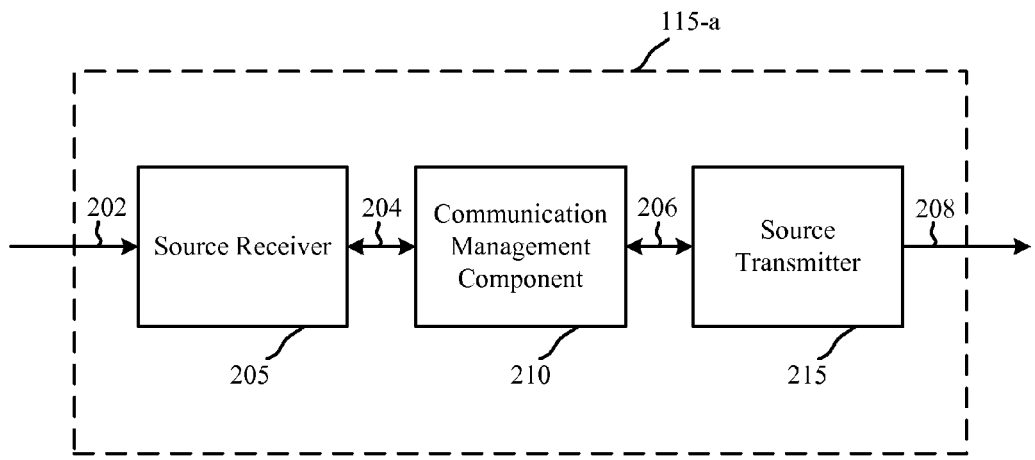
FIG. 2A shows a block diagram illustrating a source device in accordance with various embodiments.

Referring now to FIG. 2A is a block diagram 200-a illustrating a source device 115-a in accordance with various embodiments. The source device 115-a may be an example of one or more aspects of one of the source devices 115 described with reference to FIG. 1. The source device 115-a may also be a processor. The source device 115-a may include a source receiver 205, a communication management component 210, and a source transmitter 215. Each of these components may be in communication with each other.

The components of the source device 115-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors. In one embodiment, the components as shown in FIG. 2A each may include a circuit or circuitry for performing the functions described herein.

The source receiver 205 may receive communications from a sink device, such as one or more of the sink devices 135 described with reference to FIG. 1 via one or more signals 202. The received communications may be any suitable form of data. The source receiver 205 may receive these communications via a wireless (e.g., Wi-Fi) peer-to-peer connection that is established between the source device 115-a and the sink device 135 described with reference to FIG. 1. The communication management component 210 may manage communications received by the source device 115-a via one or more signals 204. Additionally, the communication management component 210 may manage, via one or more signals 206, communications transmitted from the source device 115-a to the sink device(s). Further, the communication management component 210 may process the data to control or otherwise manage aspects of the source device 115-a for providing audio and/or video streams, graphics resources, communication, and/or control instructions to one or more sink devices 135.

The source transmitter 215 may transmit communications to a sink device, such as one or more of the sink device 135 described with reference to FIG. 1 via one or more signals 208. The transmitted communications may include data such as graphics resources, audio and/or video streams, and/or communication instructions. The source transmitter 215 may transmit these communications via a wireless (e.g., Wi-Fi) peer-to-peer connection that is established between the source device 115-a and the sink device 135. Details regarding the communication management component 210 will be described below.

Figure 2B:
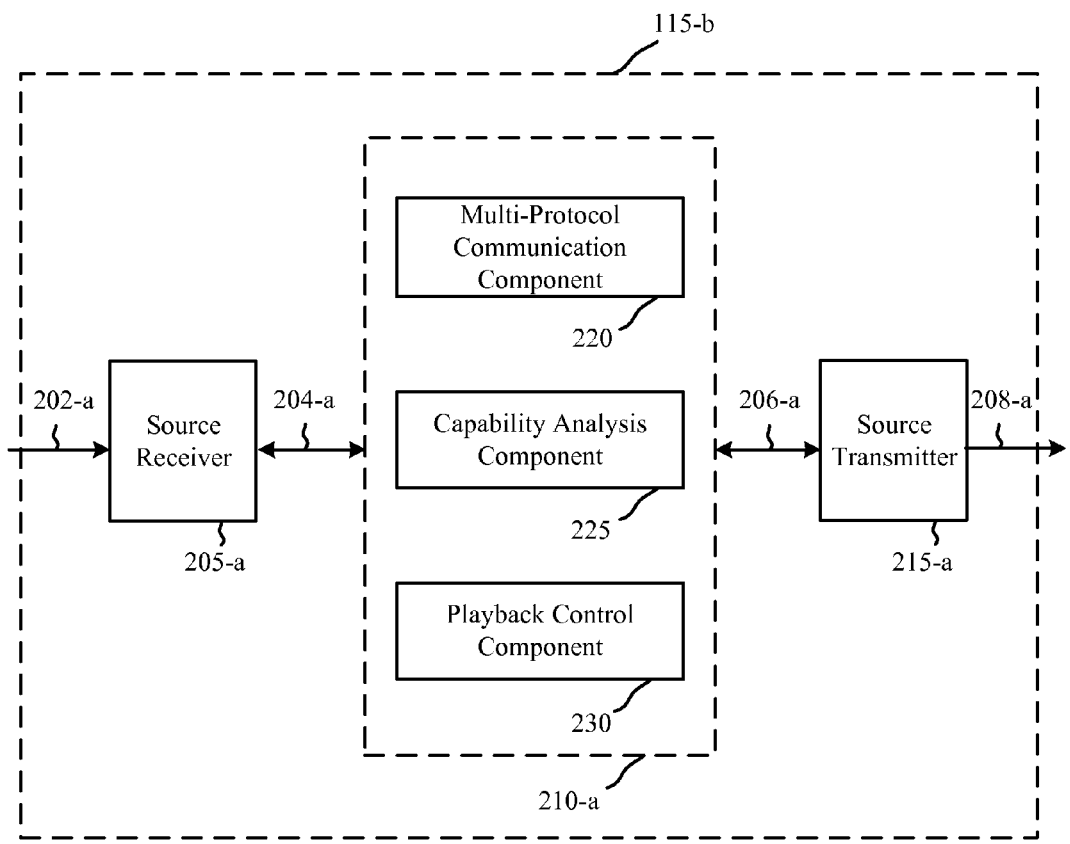
FIG. 2B shows a block diagram illustrating a source device in accordance with various embodiments.

FIG. 2B is a block diagram 200-b illustrating a source device 115-b in accordance with various embodiments. The source device 115-b may be an example of one or more aspects of one of the source devices 115 described with reference to FIGS. 1 and/or 2A. The source device 115-b may also be a processor. The source device 115-b may include a source receiver 205-a, a communication management component 210-a, and a source transmitter 215-a. Each of these components may be in communication with each other.

The components of the source device 115-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions stored in a memory, formatted to be executed by one or more general or application-specific processors. In one embodiment, the components as shown in FIG. 2B each may include a circuit or circuitry for performing the functions described herein.

The source transmitter 215-a may be configured as previously described with respect to FIG. 2A. The source receiver 205-a may also be configured as previously described with respect to FIG. 2A. The communication management component 210-a may include a multi-protocol communication component 220, a capability analysis component 225, and a playback control component 230.

In one embodiment, the multi-protocol communication component 220 may be configured to allow the source device 115-b to support communication with the sink device over multiple protocols, such as UDP and TCP. In one example, the multi-protocol communication component 220 may initialize communication with the sink device using UDP during initial session to transmit audio/video data. In another example, the multi-protocol communication component 220 may select transmission over TCP as a default initial setting to communicate with the sink device. The selection of one of a plurality of transport protocols supported by the source device 115-b may be based in part on the capabilities of the sink device, type of media content, network conditions, and/or available buffering at the sink device. Yet further, the multi-protocol communication component 220 may be configured to allow the source device 115-b to dynamically switch between UDP and TCP based on predetermined factors.

Capability analysis component 225 may assist the multi-protocol communication component 220 in selection of the appropriate transport protocol by querying the capabilities of the sink device and determining which one of the plurality of transport protocols may be best suited for streaming media content. The capability analysis component 225, during the Wi-Fi peer-to-peer remote display session, may generate one or more queries for the sink device. In one example, the capability analysis component 225 may query the sink device to determine whether the sink device supports UDP and/or TCP protocols, and associated ports information to be used by the sink device. In yet another example, the capability analysis component 225 may additional query the sink device for its decoder latency and initial buffer size that the source device may be able to allocate. In response to the transmitted queries, the capability analysis component 225 may receive one or more messages from the sink device indicating its capabilities to the source device 115-b.

In one example, a playback control component 230 may issue control commands (e.g., flush buffer, volume control etc.) to the sink device. In some examples, it may be necessary to flush the buffer of the sink device in order to allow the sink device to start buffering new data without playing previously buffered data. Similarly, the playback control component 230 may issue volume control commands in order to adjust the volume of the media content at the sink device. The volume control commands may adjust the volume at the sink device irrespective of the volume level of the audio in the stream transmitted from the source device. Some examples of volume control may include volume up, volume down, mute and/or unmute. The playback control component 230 may issue control commands while transmitting media content over either UDP or TCP. It should be understood by those of ordinary skill in the art that the playback control component 230 commands are not limited exclusively to flush buffer and/or volume control.

Figure 2C:
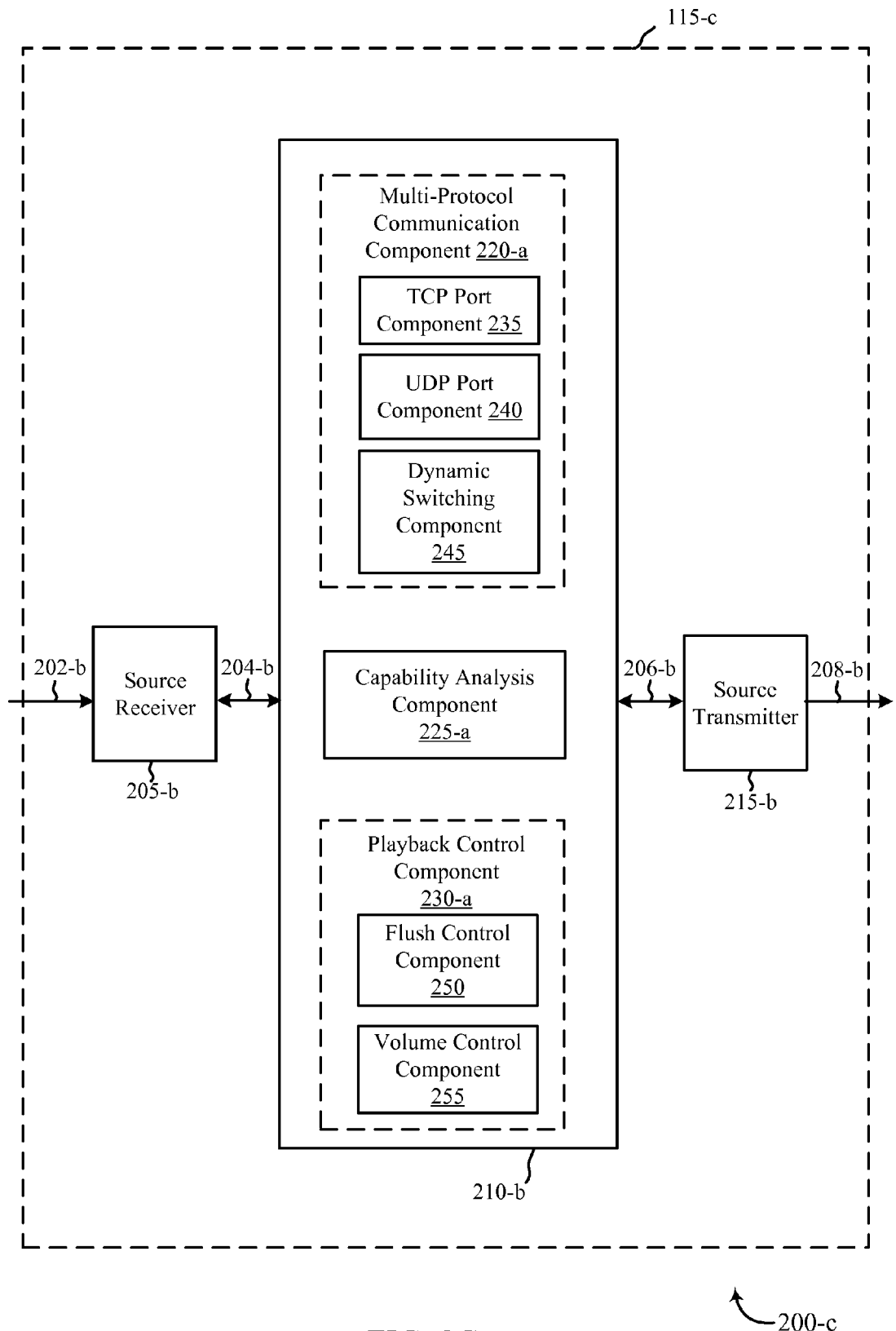
FIG. 2C shows a block diagram illustrating a source device in accordance with various embodiments.

Referring now to FIG. 2C is a block diagram 200-c illustrating a source device 115-c in accordance with various embodiments. The source device 115-*c* may be an example of one or more aspects of one of the source devices 115 described with reference to FIGS. 1, 2A and/or 2B. The source device 115-*c* may also be a processor. The source device 115-*c* may include a source receiver 205-*b*, a communication management component 210-*b*, and a source transmitter 215-*b*. Each of these components may be in communication with each other.

The components of the source device 115-*c* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions stored in a memory, formatted to be executed by one or more general or application-specific processors. In one embodiment, the components as shown in FIG. 2C each may include a circuit or circuitry for performing the functions described herein.

The source transmitter 215-*b* may be configured as previously described with respect to FIGS. 2A and/or 2B. The source receiver 205-*b* may also be configured as previously described with respect to FIG. 2A and/or 2B. The communication management component 210-*b* may include a multi-protocol communication component 220-*a*, capability analysis component 225-*a*, and a playback control component 230-*a* as described with reference to FIG. 2B.

In one embodiment, the multi-protocol communication component 220-*a* may further comprise TCP port component 235, UDP port component 240, and dynamic switching component 245. The multi-protocol communication component 220-*a* may utilize TCP port component 235 to transmit RTP media content over TCP to the sink device. In some examples, TCP port component 235 may provide communication service at an intermediate level between the application and the Internet Protocol (IP) layer. The TCP port component 235 may open or create a TCP port when communications that are latency tolerant (e.g., playback stored media) are to be transmitted over the wireless link to the sink device. Similarly, the UDP port component 240 may be utilized to transmit RTP media content over UDP from the source device 115-*c* to the sink device. In some examples, UDP port component 240 may transmit messages and/or datagrams to at least one sink device on the direct wireless link during a Wi-Fi peer-to-peer remote display session. The UDP port component 240 may create or open a UDP port when latency intolerant communications, such as real-time streaming media, are to be transmitted across the wireless link to the sink device.

In yet further example, dynamic switching component 245 may switch transport protocol from a first protocol to a second protocol based in part on the capabilities of the sink device, type of media content, network conditions, and/or available buffer space as determined by the capability analysis component 225-*a*. The first and second protocol may be either UDP and/or TCP. The capability analysis component 225-*a* may be configured as previously described with respect to FIG. 2B. In one example, upon receiving a response from the sink device, the dynamic switching component 245 may initiate switching utilization of transport protocol from a first protocol to a second protocol by issuing an RTSP request message (e.g., RTSP SET_PARAMETER request) comprising profile and port information. In some instances, the first protocol may be UDP and the second protocol may be TCP. Alternatively, in other instances, the first protocol may be TCP and the second protocol may be UDP.

In one example, the source device 115-*c*, upon receiving an affirmative response to the issued RTSP SET_PARAMETER request for setting up TCP transport for media data, may establish communication with the sink device. In some examples, the sink device may be configured as a TCP server, while the source device 115-*c* operates as a TCP client. In one example, it may be necessary to change audio and/or video formats either before, during, and/or after switching from a first protocol to a second protocol, wherein the first or the second protocol may be either UDP or TCP.

In some examples, the dynamic switching component 245 may further request to allocate a specified amount of buffer space in the sink device prior to dynamically switching from the first protocol to the second protocol. The source device 115-*c* may include initial buffer size as a parameter to the RTSP SET_PARAMETER request message that it may send to the sink device. Allocation of a predetermined minimum buffer space may be necessary because Wi-Fi link between the source device 115-*c* and the sink device may be jittery and/or error-prone. As a result, a predetermined minimum amount of buffering may be provided at the sink device to smooth the jitter and packet latency caused by errors in the channel (e.g., retransmissions of data, etc.) and to maintain good quality of video rendered at the sink device. In some examples, the sink buffer size may be dynamically controlled by the source device 115-*c* based on a type of application for a media stream being transmitted from the source device 115-*c* to the sink device for presentation. For example, the techniques may select a buffer size that is smaller for gaming applications, larger for interactive media applications (e.g., interactive computing, presentations, bi-directional communication, etc.), and even larger for non-interactive media types (e.g., streaming video, static images, etc.).

Source device 115-*c* may further include user settings that allow the user to select preferences related to the amount of buffering at the sink device 135. For example, the user may be able to choose a preference between lower latency or higher reliability display of the media stream and the source device 115-*c* may adjust the sink buffer size accordingly. The user may further be able to set sink buffer size preferences based on the use categories, for individual applications, or for individual media streams. In some examples, the user may be able to set the sink buffer size directly (e.g., in ms, etc.) prior to switching transmission from a first protocol to a second protocol.

In yet another example, a playback control component 230-*a* may determine whether to issue control commands (e.g., flush buffer, volume control etc.) to the sink device. Flush control component 250 may determine whether to flush the buffer of the sink device based in part on a query requesting the current presentation time and amount of buffered data of the audio and/or video stream at the sink device. Table 1 illustrates one example of a message exchange between the source device 115-*c* and the sink device with respect to a request for audio and video timing and buffer status.

TABLE 1

| | |
|---|---|
| Source Device to Sink Device | GET_Parameter rtsp://localhost/wfd1.0 RTSP/1.0<br>CSeq: 7<br>Session: A0AFGH36<br>Content-Length n<br>Content-Type: text/parameter<br>wfd_audio_present_time<br>wfd_audio_buffer<br>wfd_video_present_time<br>wfd_video_buffer |
| Sink Device to Source Device | RTSP/1.0 200 OK<br>CSeq: 7<br>Session: A0AFGH36<br>Content-Length: x<br>Content-Type: text/parameter<br>wfd_audio_present_time: 391010<br>wfd_audio_buffer: 300<br>wfd_video_present_time: 392020<br>wfd_video_buffer: 600 |

Based at least in part on the response from the sink device, the flush control component 250 may flush the buffer of the sink device in order to allow the sink device to start buffering new data without playing previously buffered data. The flush control component 250 may issue a RTSP request message (e.g., RTSP SET_PARAMETER request) to sink device to flush the buffer of the sink device to a specified presentation time stamp (PTS) and/or decode time stamp (DTS) values. In some examples, the flush control component 250 may pause streaming of the media content prior to issuing the flush command to the sink device with a PTS value associated with the largest PTS transmitted from the source device 115-c to the sink device. Upon receiving either a successful RTSP response or a failure message in response from the sink device, the source device 115-c may resume streaming the RTP data over either UDP or TCP as previously scheduled.

Similarly, a volume control component 255 of the playback control component 230-a may issue volume control commands in order to adjust the volume of the media content at the sink device. The volume control commands may adjust the volume at the sink device irrespective of the volume level of the audio in the stream transmitted from the source device 115-c. Some examples of the volume control may include volume up, volume down, mute and/or unmute.

Figure 3A:
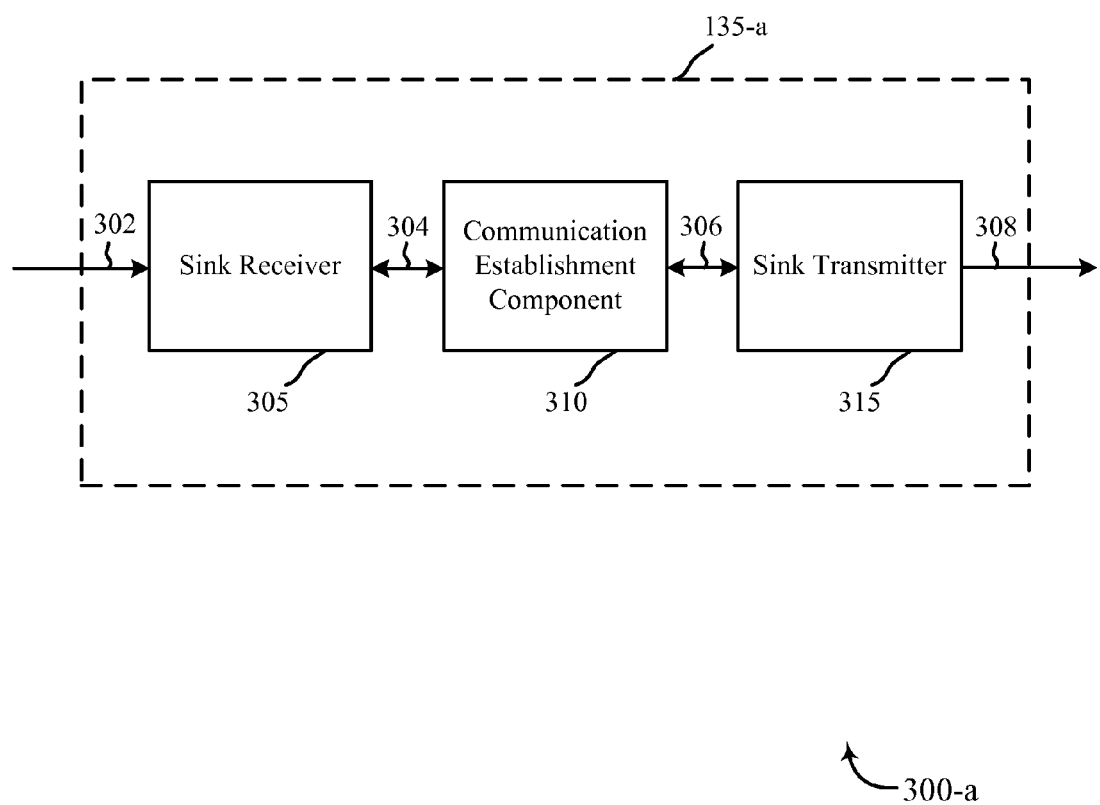
FIG. 3A shows a block diagram illustrating a sink device in accordance with various embodiments.

Referring now to FIG. 3A, a block diagram 300-a illustrates a sink device 135-a in accordance with various embodiments. The sink device 135-a may be an example of one or more aspects of one of the sink devices 135 described with reference to FIGS. 1, 2A, 2B, and 2C. The sink device 135-b may also be a processor. The sink device 135-b may include a sink receiver 305, a communication establishment component 310, and a sink transmitter 315. Each of these components may be in communication with each other.

The components of the sink device 135-a may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions stored in a memory, formatted to be executed by one or more general or application-specific processors. In one embodiment, the components as shown in FIG. 3A each may include a circuit or circuitry for performing the functions described herein.

The sink receiver 305 may receive communications from one or more source devices, such as the source devices 115 described with reference to FIGS. 1, 2A, 2B, and/or 2C, via one or more signals 302. As described herein, the communications may include audio and/or video streams, graphics resources, and/or rendering instructions. The sink receiver 305 may receive these communications via a wireless (e.g., Wi-Fi) peer-to-peer connection that is established between the sink device 135-a and the one or more source devices 115. The communication establishment component 310 may manage such communications received by the sink device 135-a via one or more signals 304. Additionally, the communication establishment component 310 may manage, via one or more signals 306, communications transmitted from the sink device 135-a to the source device(s). As described herein, these communications may include data representing user input at the sink device 135-a for interacting with the source device(s) and/or one or more applications running on the source device(s). The sink transmitter 315 may transmit such data from the sink device 135-a via the Wi-Fi connection, via one or more signals 308. Further details regarding the communication establishment component 310 will be described below.

Figure 3B:
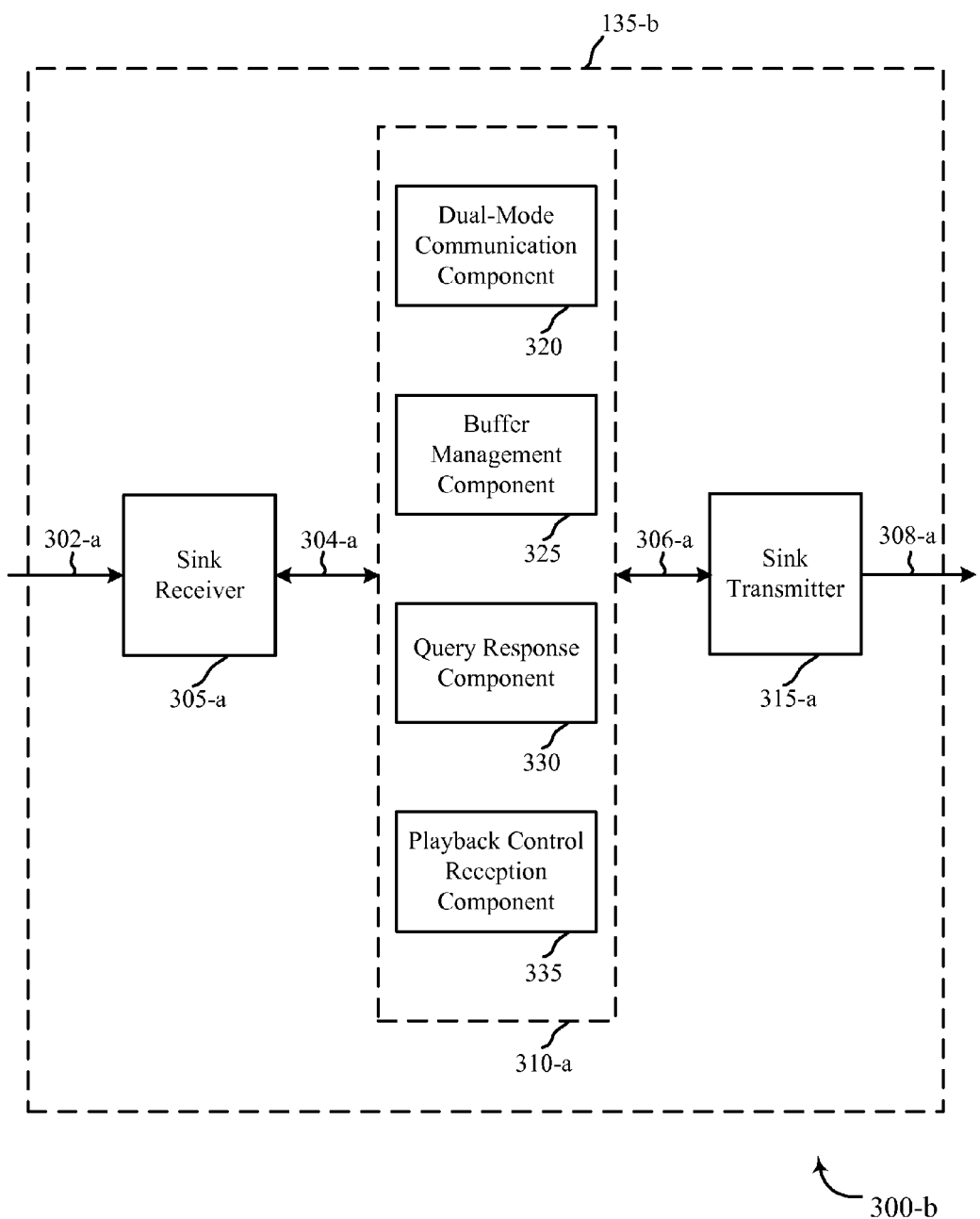
FIG. 3B shows a block diagram illustrating a sink device in accordance with various embodiments.

FIG. 3B is a block diagram 300-b illustrating a sink device 135-b in accordance with various embodiments. The sink device 135-b may be an example of one or more aspects of one of the sink devices 135 described with reference to FIGS. 1, 2A, 2B, 2C, and/or 3A. The sink device 135-b may also be a processor. The sink device 135-b may include a sink receiver 305-a, a communication establishment component 310-a, and a sink transmitter 315-a. Each of these components may be in communication with each other.

The components of the sink device 135-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions stored in a memory, formatted to be executed by one or more general or application-specific processors. In one embodiment, the components as shown in FIG. 3B each may include a circuit or circuitry for performing the functions described herein.

The sink receiver 305-a and the sink transmitter 315-a may be configured as previously described with reference to FIG. 3A. The communication establishment component 310-a may include a dual-mode communication component 320, a buffer management component 325, a query response component 330, and a playback control reception component 335.

The dual-mode communication component 320 may be configured to decode media content received from the source device via either UDP or TCP transport protocol. In such instances, the dual-mode communication component 320 may identify its capabilities to the source device by providing indication to the query response component 330 to transmit a response to the source device that the sink device 135-b is configured to receive media content over both UDP and TCP.

The buffer management component 325 may be configured to manage the buffer of the sink device 135-b. In some examples, the source device may request to allocate a specified amount of buffer space in the sink device 135-b to smooth the jitter and packet latency caused by errors in the channel (e.g., retransmissions of data, etc.) and to maintain good quality of video rendered at the sink device 135-*b*. In some examples, the sink buffer size may be dynamically allocated by the source device based on a type of application for a media stream being transmitted from the source device to the sink device for presentation. As a result, the buffer management component 325 may be configured to buffer a predetermined amount of media content in the buffer prior to rendering the media content on the display device (not shown). The buffer management component 325 may further respond to flush commands issued by the source device. In such instances, the buffer management component 325 may flush the buffer to a specified PTS value. In some examples, the buffer management component 325 may further provide critical information to the query response component 330 in response to queries issued by the source device. Critical information may comprise initial buffer size, current presentation time of the audio and/or video stream being played, and available buffer space.

The query response component 330 may collect information from the dual-mode communication component 320 and buffer management component 325 to generate messages to the source device in response to issued queries requesting information from the sink device 135-*b*. In yet further example, playback control reception component 335 may be configured to receive control information such as volume control to adjust the volume of the media content streamed to the sink device 135-*b* from the source device. In response, the playback control reception component 335 may adjust the volume at the sink device irrespective of the volume level of the audio in the stream transmitted from the source device. In some examples, the volume control may include volume up, volume down, mute and/or unmute.

Figure 4:
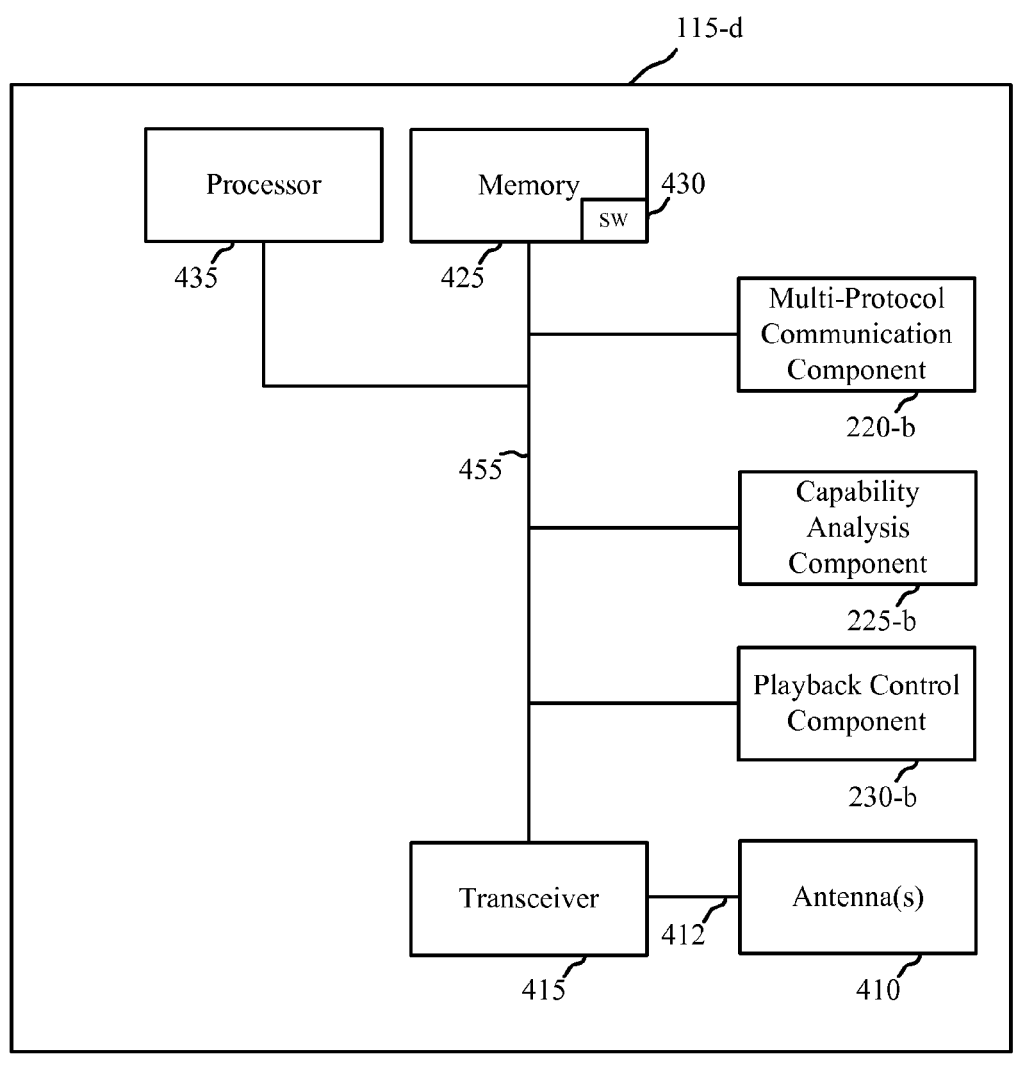
FIG. 4 is a block diagram of illustrating a device in accordance with various embodiments.

FIG. 4 is a block diagram 400 illustrating a device 115-*d* according to various embodiments. The device 115-*d* may be an example of one or more aspects of one of the source devices 115 described with reference to FIGS. 1, 2A, 2B, and/or 2C. The device 115-*d* may be configured to participate in Wi-Fi direct communications with other wireless devices (e.g., via a Wi-Fi peer-to-peer connection) to provide content for another device(s). The device 115-*d* may have any of various examples, such as personal computers (e.g., laptop computers, netbook computers, tablet computers, etc.), cellular telephones, PDAs, digital video recorders (DVRs), internet appliances, gaming consoles, e-readers, etc. The device 115-*d* may have an internal power supply (not shown), such as a small battery, to facilitate mobile operation.

The device 115-*d* includes antennas 410, a transceiver 415, memory 425, and a processor 435, which each may be in communication, directly or indirectly, with each other (e.g., via one or more buses 455). The transceiver 415 is configured to communicate bi-directionally, via the antennas 410, as described above. For example, the transceiver 415 may be configured to communicate bi-directionally with other devices 115 and/or 135 of FIGS. 1, 2A, 2B, 2C, 3A, and/or 3B. The transceiver 415 may include the receiver 205 and the transmitter 215 of FIG. 2, as previously described. In one embodiment, the transceiver 415 may further include a modem configured to modulate packets and provide the modulated packets to the antennas 410 for transmission, and to demodulate packets received from the antennas 410. While the device 115-*d* may include a single antenna, the device 115-*d* will typically include multiple antennas 410 for multiple links.

The memory 425 may include random access memory (RAM) and read-only memory (ROM). The memory 425 may store computer-readable, computer-executable software code 430 containing instructions that are configured to, when executed, cause the processor 435 to perform various functions described herein (e.g., identify/determine/obtain audio and/or video streams, graphics resources, and/or rendering instructions, receive, transmit, etc.). Alternatively, the software 430 may not be directly executable by the processor 435 but be configured to cause the computer (e.g., when compiled and executed) to perform functions described herein.

The processor 435 may include an intelligent hardware device, e.g., a central processing unit (CPU), a microcontroller, an ASIC, etc. According to the architecture of FIG. 4, the device 115-*d* may further include a multi-protocol communication component 220-*b*, a capability analysis component 225-*b*, and a playback control component 230-*b* as described with reference to FIGS. 2A and 2B. The multi-protocol communication component 220-*b*, capability analysis component 225-*b*, and playback control component 230-*b* may be a component of the device 115-*d* in communication with some or all of the other components of the device 115-*d* via a bus 455.

The components of the device 115-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted components may be a means for performing one or more functions related to operation of the device 115-*d* as described herein.

Figure 5:
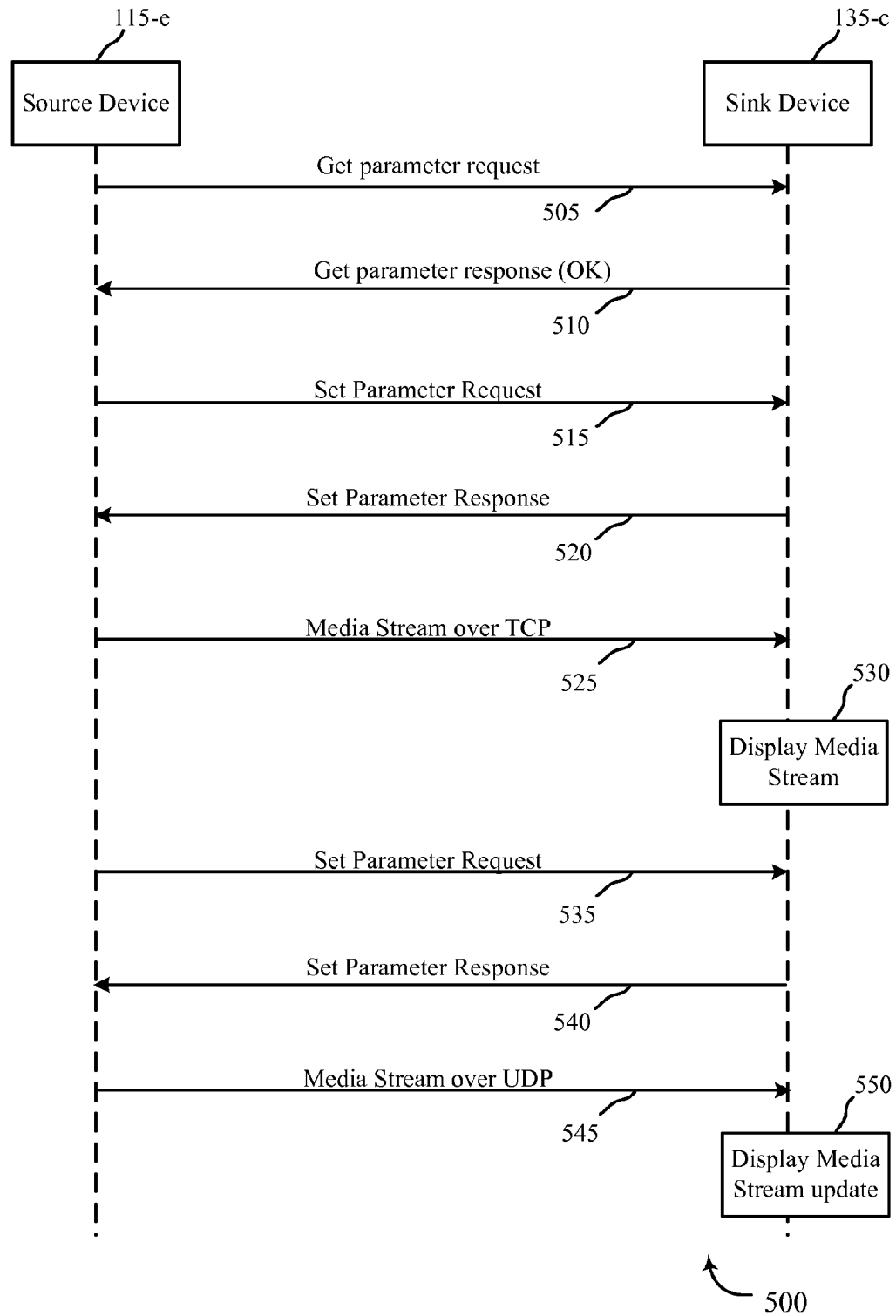
FIG. 5 shows a message flow diagram illustrating a flow of communication between a source device and a sink device in accordance with various embodiments.

FIG. 5 is a message flow diagram 500 illustrating one example of communications between a source device 115-*e* and a sink device 135-*c*. The source device 115-*e* may be an example of the devices 115 of FIGS. 1, 2, and/or 4. The sink device 135-*c* may be an example of the sink devices 135 illustrated in FIGS. 1 and/or 3. In one example, the source device 115-*e* and the sink device 135-*c* may be connected via a Wi-Fi peer-to-peer connection. The source device 115-*e* may have established communication with the sink device 135-*c* utilizing UDP transport protocol. Alternately, it should be understood by those in the art that the default communication link between the source device 115-*e* and sink device 135-*c* is not limited to transmission of RTP media data over UDP, but may also alternatively include TCP transport protocol.

With reference to FIG. 5, the source device 115-*e* may transmit an RTSP "get parameter request" 505 to the sink device 135-*c* in order to query the capabilities of the sink device 135-*c*. The "get parameter request" 505 may request information, such as whether the sink device 135-*c* supports TCP protocol, port information to be used for RTP over TCP transport, decoder latency, and/or the initial buffer size of the sink device 135-*c*. In response, the sink device 135-*c* may issue an "RTSP "get parameter response" 510 indicating whether the sink device 135-*c* is capable of decoding RTP media content over TCP along with the port information to be used for the TCP transport, and the requested buffer size values. Upon returning an "RTSP OK" 510 from the sink device 135-c in response to the RTSP "get parameter request" 505 for TCP from the source device 115-e, the sink device 135-c starts its TCP server and is ready to accept the connection over the TCP in the designated port. Table 2 shows one example of an exchange between the source device 115-e and the sink device 135-c with respect to queries issued by the source device 115-e. In one example, the communication management component 210 of the source device 115 described with reference to FIGS. 1 and/or 2 and communication establishment component 310 of the sink device 135 described with reference to FIG. 3 may execute one or more sets of codes to control the functional elements of a source device 115-e and sink device 135-c respectively to perform the functions described below.

TABLE 2

| Source Device to Sink Device: | GET_Parameter rtsp://localhost/wfd1.0<br>CSeq: 4<br>Session: A0AFGH36<br>Content-Length n<br>Content-Type: text/parameter<br>wfd_tcp_support<br>wfd_client_rtp_over_tcp_ports<br>wfd_initial_buffer |
|---|---|
| Sink Device to Source Device: | RTSP/1.0 200 OK<br>CSeq: 4<br>Session: A0AFGH36<br>Content-Length: x<br>Content-Type: text/parameter<br>wfd_tcp_support: supported<br>wfd_client_rtp_over_tcp_ports:<br>RTP/AVP/TCP; unicast 19136 0 mode=play<br>wfd_initial_buffer: 500 |

The source device 115-e, upon receiving the capability information from the sink-device 135-c, may reply with an RTSP "set parameter request" 515 to initiate switching transmission of media content from RTP over UDP to RTP over TCP. In some examples, the switching from the first transport protocol to the second transport protocol comprises an internal pause in the source and the sink device. The "set parameter request" 515 may comprise RTSP setup request with wfd-rtp-client-over-tcp-ports parameter containing the RTP/AVP/TCP profile and port information. The sink device 135-c, in return, may execute a TCP server at the sink device 135-c and return a RTSP "set parameter response" 520 indicating that the sink device 135-c has already started its TCP server and is ready to accept connection from the source device 115-e.

The source device 115-e, upon receiving an affirmative "set parameter response" 520 may begin communicating with the sink device 135-c by transmitting RTP media content over TCP 525. When the RTP data is to be sent over TCP transport, each RTP packet data may be framed according to the IETF RFC 4571, "Framing Real-time Transport Protocol (RTP) and RTP Control Protocol (RTCP) packets over Connection-Oriented Transport." The sink-device 135-c may render the streamed media content 530 on the display of the sink-device 135-c. Table 3 illustrates one example of the above illustrated message exchange between the source device 115-e and the sink device 135-c with respect to switching transmission from UDP to TCP and/or TCP to UDP. It would be understood by those in the art that the illustrated examples are not limiting to the specified example.

TABLE 3

| Source Device to Sink Device | SET_Parameter rtsp://localhost/wfd1.0 RTSP/1.0<br>CSeq: 5<br>Session: A0AFGH36 |
|---|---|

TABLE 3-continued

| | Content-Length n<br>Content-Type: text/parameter<br>wfd_client_rtp_over_tcp_ports: RTP/AVP/TCP;<br>unicast 19136 0<br>mode=play<br>wfd_initial_buffer: 3000 |
|---|---|
| Sink Device to Source Device | RTSP/1.0 200 OK<br>CSeq: 5<br>Session: A0AFGH36<br>Content-Length: x<br>Content-Type: text/parameter<br>wfd_client_rtp_over_tcp_ports: RTP/AVP/TCP;<br>unicast 19136 0<br>mode=play |

In further examples, the source device 115-e, based in part on the type of content and/or network conditions, may again seek to revert back to transmitting media content over UDP. In such an instance, the source device 115-e may issue a "set parameter request" 535 to initiate the process of switching transport protocol from TCP to UDP. As a result, the sink device 135-c may respond with a "set parameter response" 540 to indicate that the sink device 135-c is configured to switch from receiving RTP data over TCP to receiving RTP data over UDP. Consequently, the source device 115-e may resume streaming media content over UDP 545, which may be rendered and displayed 550 on the sink device 135-c.

Figure 6:
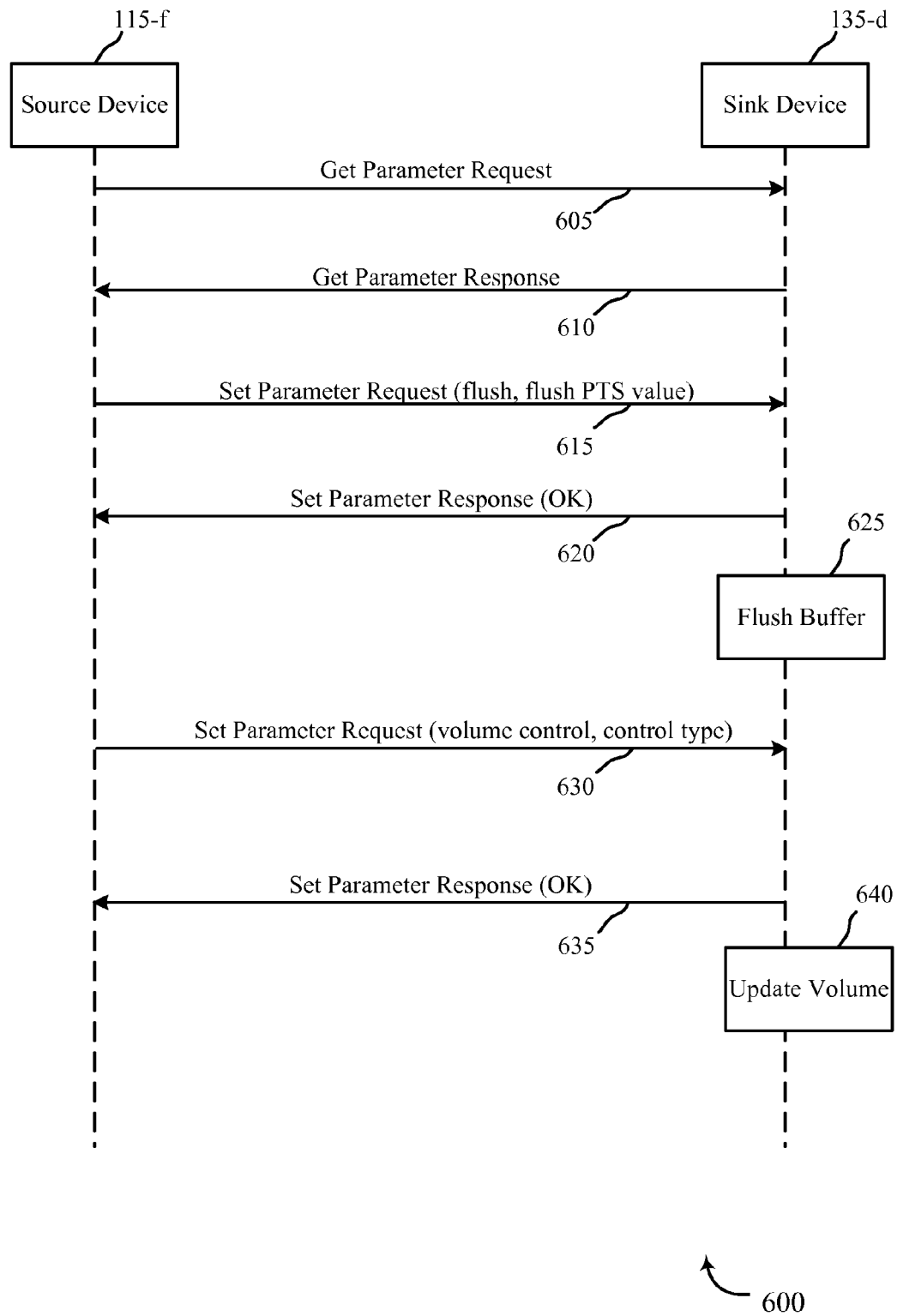
FIG. 6 shows another example of message flow diagram illustrating a flow of communication between a source device and a sink device in accordance with various embodiments.

FIG. 6 is a message flow diagram 600 illustrating another example of communications between a source device 115-f and a sink device 135-d. The source device 115-f may be an example of the devices 115 of FIGS. 1, 2, 4 and/or 5. The sink device 135-d may be an example of the sink devices 135 illustrated in FIGS. 1 and/or 3. In one example, the source device 115-f and the sink device 135-d may be connected via a Wi-Fi peer-to-peer connection. The source device 115-f may established communication with the sink device 135-d utilizing either UDP or TCP transport protocol.

In some examples, the source device 115-f may issue playback control commands, such as flush command and volume control command to the sink device 135-d. However, similar in the manner described with reference to FIG. 5, issuing of control commands are preceded with establishing capability negotiation procedures between source device 115-f and sink device 135-d. With reference to FIG. 6, the negotiation is based on RTSP "get parameter request" 605 and RTSP "get parameter response" 610 exchanged between the source device 115-f and sink device 135-d respectively. Thereafter, the source device 115-f may issue a flush command 615 identifying a PTS value of a data packet transmitted from the source device 115-f to the sink device 135-d to which the sink device 135-d may flush its respective buffer. Upon successful processing of the issued flush command, the sink device 135-d may respond affirming response 620. Consequently, the sink device 135-d may flush buffer 625 of the sink device 135-d to the PTS value. Table 4 illustrates one example of flush command exchange between the source device 115-f and the sink device 135-d.

TABLE 4

| Source Device to Sink Device | SET_Parameter rtsp://localhost/wfd1.0 RTSP/1.0<br>CSeq: 8<br>Session: A0AFGH36<br>Content-Length n<br>Content-Type: text/parameter<br>wd_playback_control: flush; flush_timing=393000 |
|---|---|
| Sink Device to Source Device | RTSP/1.0 200 OK<br>Cseq: 8 |

Similarly, the source device 115-*f* may issue a volume control commands 630 to the sink device 135-*d* to adjust the volume of the data stream to the sink device 135-*d*. Upon successful processing of the issued volume control command 630, the sink device 135-*d* may respond affirming the response 635. Consequently, the sink device 135-*d* may adjust or update the volume of the media content 640 at the sink device 135-*d*. The volume at the sink device 135-*d* may be adjusted or updated irrespective of the volume level of the audio in the stream transmitted from the source device 115-*f*. Some examples of the volume control may include volume up, volume down, mute and/or unmute. Table 5 illustrates one example of volume control exchange between the source device 115-*f* and sink device 135-*d* initiated by the volume control component 255 of the source device 115 as described with reference to FIG. 2C.

TABLE 5

| | |
|---|---|
| Source Device to Sink Device | SET_Parameter rtsp://localhost/wfd1.0 RTSP/1.0<br>CSeq: 9<br>Session: A0AFGH36<br>Content-Length n<br>Content-Type: text/parameter<br>wd_playback_control: control_volume; control=mute |
| Sink Device to Source Device | RTSP/1.0 200 OK<br>Cseq: 9 |

Figure 7:
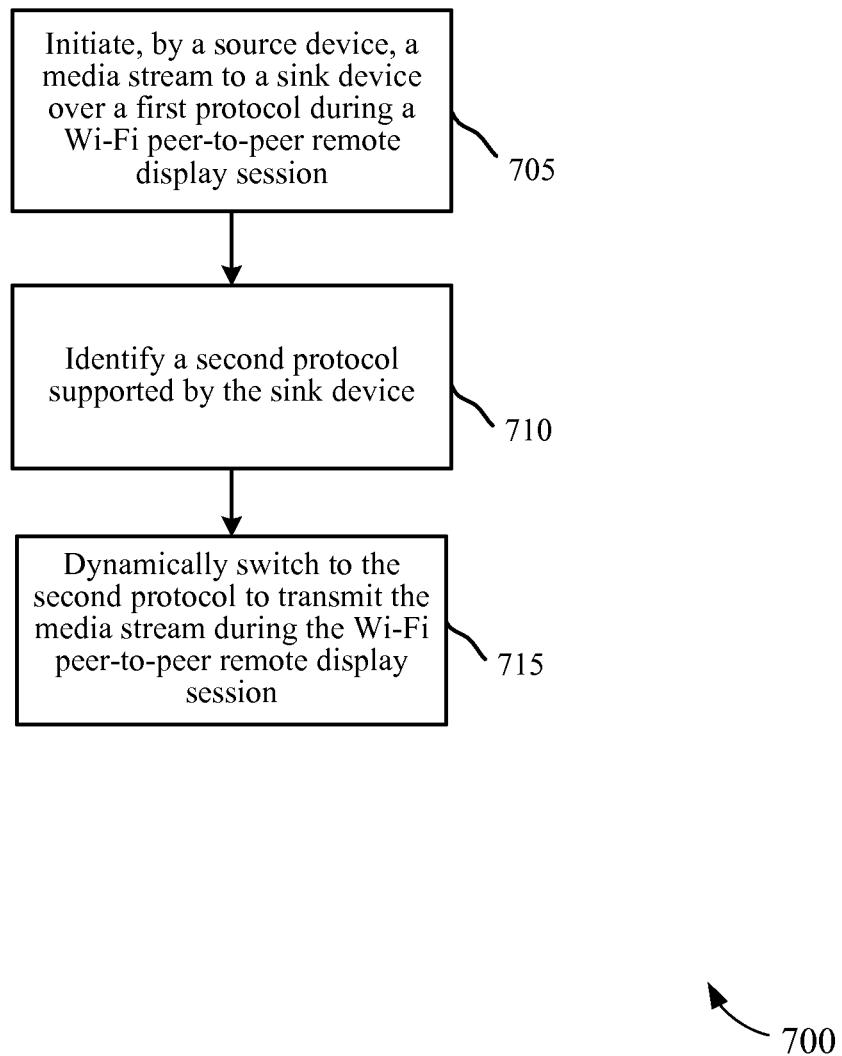
FIG. 7 is a flowchart illustrating an example of a method performed by a source device for remote display of content by a sink device in accordance with various embodiments.

FIG. 7 illustrates a method 700 performed by a source device 115 for wireless communication with the sink device 135. For clarity, the method 700 is described below with reference to the system 100 shown in FIG. 1, and/or with reference to one of the devices 115 described with reference to FIGS. 1, 2A, 2B, 2C, 4, 5 and/or 6. In one implementation, the communication management component 210 described with reference to FIGS. 2A, 2B, and/or 2C may execute one or more sets of codes to control the functional elements of a source device 115 to perform the functions described below.

At block 705 of method 700, the source device 115 initiates a media stream to a sink device over a first protocol during a Wi-Fi peer-to-peer remote display session. The operation(s) of block 705 may be performed by the communication management component 210 and/or multi-protocol communication component 220 as described with reference to FIGS. 2A, 2B and/or 2C.

At block 710 of method 700, the source device 115 may identify a second protocol supported by the sink device 135. The operation(s) of block 710 may be performed by the capability analysis component 225 as described with reference to FIGS. 2B and/or 2C. At block 715, the source device 115 may dynamically switch to the second protocol to transmit the media stream during the Wi-Fi peer-to-peer remote display session. The operation(s) of block 715 may be performed by the dynamic switching component 245 as described with reference to FIG. 2C.

Figure 8:
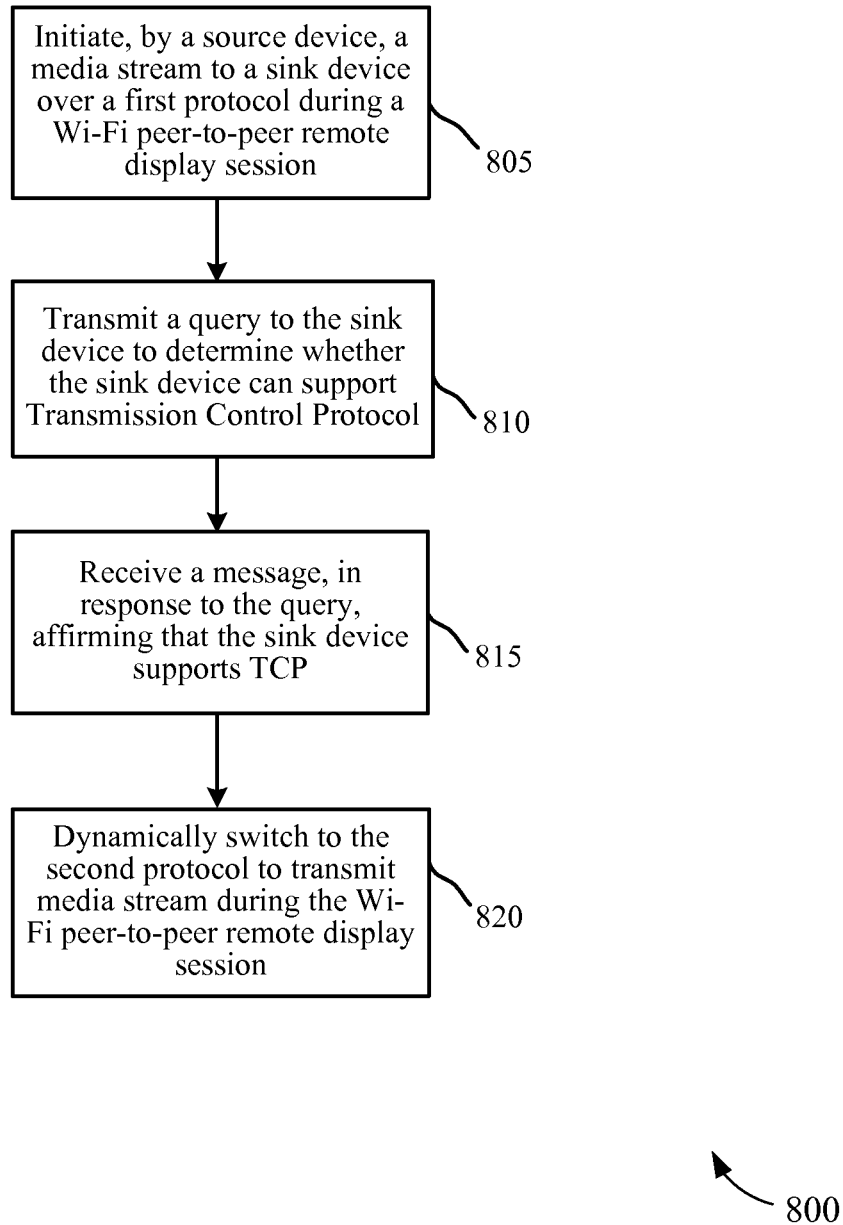
FIG. 8 is a flowchart illustrating an example of a method performed by a source device in accordance with various embodiments.

FIG. 8 illustrates a method 800 performed by a source device 115 for wireless communication with the sink device 135. For clarity, the method 800 is described below with reference to the system 100 shown in FIG. 1, and/or with reference to one of the devices 115 described with reference to FIGS. 1, 2A, 2B, 2C, 4, 5 and/or 6. In one implementation, the communication management component 210 described with reference to FIGS. 2A, 2B, and/or 2C may execute one or more sets of codes to control the functional elements of a source device 115 to perform the functions described below.

At block 805 of method 800, the source device 115 initiates a media stream to a sink device over a first protocol during a Wi-Fi peer-to-peer remote display session. The operation(s) of block 805 may be performed by the communication management component 210 and/or multi-protocol communication component 220 as described with reference to FIGS. 2A, 2B and/or 2C.

At block 810 of method 800, the source device 115 may transmit a query to the sink device to determine whether the sink device can support TCP transport protocol, along with port information to be used for a TCP connection. The operation(s) of block 810 may be performed by the capability analysis component 225 as described with reference to FIGS. 2B and/or 2C. At block 815, the source device 115 may receive a message, in response to the query, affirming that the sink device supports TCP, and associated TCP ports the sink device will be listening to. The operation(s) of block 815 may be performed by the source receiver 205 as described with reference to FIG. 2A, 2B, and/or 2C.

At block 820 of method 800, the source device 115 may dynamically switch to the second protocol to transmit the media stream during the Wi-Fi peer-to-peer remote display session. The operation(s) of block 820 may be performed by the dynamic switching component 245 as described with reference to FIG. 2C.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In embodiments, the components as shown in FIGS. 2A, 2B, 2C, 3A, 3B, and 4, each include a circuit or circuitry for performing the functions described herein with reference to FIGS. 2A, 2B, 2C, 3A, 3B, and 4.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   initiating, by a source device, a media stream to a sink device over a first protocol during a Wi-Fi peer-to-peer remote display session;
   identifying a second protocol supported by the sink device; and
   dynamically switching to the second protocol to transmit the media stream during the Wi-Fi peer-to-peer remote display session.

2. The method of claim 1, wherein the first protocol comprises a User Datagram Protocol (UDP) and the second protocol comprises Transmission Control Protocol (TCP).

3. The method of claim 1, wherein the first protocol comprises Transmission Control Protocol (TCP) and the second protocol comprises User Datagram Protocol (UDP).

4. The method of claim 1, wherein identifying the second protocol supported by the sink device comprises:
   transmitting a query to the sink device to determine whether the sink device supports Transmission Control Protocol (TCP) and one or more ports to be used for a TCP connection; and
   receiving a message, in response to the query, affirming that the sink device supports TCP, and the ports information.

5. The method of claim 4, further comprising:
   querying the sink device to determine decoder latency and a buffer size of the sink device.

6. The method of claim 4, further comprising:
   transmitting, in response to the received message, a setup request to the sink device, wherein the setup request comprises profile and port information.

7. The method of claim 1, wherein dynamically switching to the second protocol is based at least in part on a type of media content, network conditions, or available buffer space at the sink device.

8. The method of claim 7, further comprising:
   selecting, based at least in part on the type of media content, network conditions, or available buffer space at the sink device, a buffer size to be used by the sink device for buffering the media stream prior to initiating playback; and
   transmitting the selected buffer size to the sink device.

9. The method of claim 1, further comprising:
   querying the sink device for a presentation timestamp (PTS) value of the media stream being played and a pending buffer size of the media stream waiting to be played; and
   receiving a message, in response to the query, indicating the PTS value of the media stream being played and the pending buffer size of the media stream waiting to be played.

10. The method of claim 9, further comprising:
    issuing a flush control command to flush a buffer of the sink device.

11. The method of claim 10, wherein the flush control command instructs the sink device to discard data in the buffer until a data packet with the PTS value.

12. The method of claim 1, further comprising:
    issuing a volume control command to the sink device, wherein the volume control command controls a playback volume of the media stream at the sink device.

13. An apparatus for wireless communication, comprising:
    a processor;
    a memory in electronic communications with the processor, the memory embodying instructions, the instructions being executable by the processor to:
      initiate, by a source device, a media stream to a sink device over a first protocol during a Wi-Fi peer-to-peer remote display session;

identify a second protocol supported by the sink device; and dynamically switch to the second protocol to transmit the media stream during the Wi-Fi peer-to-peer remote display session.

14. The apparatus of claim 13, wherein the first protocol comprises a User Datagram Protocol (UDP) and the second protocol comprises Transmission Control Protocol (TCP).

15. The apparatus of claim 13, wherein the first protocol comprises Transmission Control Protocol (TCP) and the second protocol comprises User Datagram Protocol (UDP).

16. The apparatus of claim 13, wherein the instructions executable by the processor to identify the second protocol supported by the sink device are further executable by the processor to:

transmit a query to the sink device to determine whether the sink device supports Transmission Control Protocol (TCP) and one or more ports to be used for a TCP connection; and receive a message, in response to the query, affirming that the sink device supports TCP, and the ports information.

17. The apparatus of claim 16, wherein the instructions are further executable by the processor to:

query the sink device to determine decoder latency and a buffer size of the sink device.

18. The apparatus of claim 16, wherein the instructions are further executable by the processor to:

transmit, in response to the received message, a setup request to the sink device, wherein the setup request comprises profile and port information.

19. The apparatus of claim 13, wherein dynamically switching to the second protocol is based at least in part on a type of media content, network conditions, or available buffer space at the sink device.

20. The apparatus of claim 19, wherein the instructions are further executable by the processor to:

select, based at least in part on the type of media content, network conditions, or available buffer space at the sink device, a buffer size to be used by the sink device for buffering the media stream prior to initiating playback; and transmit the selected buffer size to the sink device.

21. The apparatus of claim 13, wherein the instructions are further executable by the processor to:

query the sink device for a presentation timestamp (PTS) value of the media stream being played and a pending buffer size of the media stream waiting to be played; and receive a message, in response to the query, indicating the PTS value of the media stream being played and the pending buffer size of the media stream waiting to be played.

22. The apparatus of claim 21, wherein the instructions are further executable by the processor to:

issue a flush control command to flush a buffer of the sink device.

23. The apparatus of claim 22, wherein the flush control command instructs the sink device to discard data in the buffer until a data packet with the PTS value.

24. The apparatus of claim 13, wherein the instructions are further executable by the processor to:

issue a volume control command to the sink device, wherein the volume control command controls a playback volume of the media stream at the sink device.

25. An apparatus for wireless communication, comprising:

a multi-protocol communication component to initiate, by a source device, a media stream to a sink device over a first protocol during a Wi-Fi peer-to-peer remote display session;

a capability analysis component to identify a second protocol supported by the sink device; and a dynamic switching component to dynamically switch to the second protocol to transmit the media stream during the Wi-Fi peer-to-peer remote display session.

26. The apparatus of claim 25, wherein the first protocol comprises a User Datagram Protocol (UDP) and the second protocol comprises Transmission Control Protocol (TCP).

27. The apparatus of claim 25, wherein the first protocol comprises Transmission Control Protocol (TCP) and the second protocol comprises User Datagram Protocol (UDP).

28. The apparatus of claim 25, further comprising:

a transmitter to transmit a query to the sink device to determine whether the sink device can support Transmission Control Protocol (TCP) and one or more ports to be used for a TCP connection; and a receiver to receive a message, in response to the query, affirming that the sink device supports TCP, and the ports information, wherein the transmitter and the receiver are in communication with the capability analysis component to identify the second protocol supported by the sink device.

29. The apparatus of claim 28, wherein the capability analysis component is further to:

query the sink device to determine decoder latency, and a buffer size of the sink device.

30. The apparatus of claim 28, wherein:

the transmitter is further to transmit, in response to the received message, a setup request to the sink device, wherein the setup request comprises profile and port information.

* * * * *